United States Patent [19]

Osterwald et al.

[11] Patent Number: 5,833,766
[45] Date of Patent: Nov. 10, 1998

[54] METHOD AND CONDITIONING SYSTEM FOR REGENERATING REPLACEMENT FILTERS

[76] Inventors: Mark Osterwald, Lange Strasse 36, 38100 Braunschweig; Marco Hein, Marienstrasse 32, 38104 Braunschweig; Ralf Utermohlen, Helmstedter Strasse 11, 38102 Braunschweig, all of Germany

[21] Appl. No.: 596,138

[22] PCT Filed: Aug. 19, 1994

[86] PCT No.: PCT/DE94/00972

§ 371 Date: Apr. 2, 1996

§ 102(e) Date: Apr. 2, 1996

[87] PCT Pub. No.: WO95/05883

PCT Pub. Date: Mar. 2, 1995

[30] Foreign Application Priority Data

Aug. 21, 1993 [DE] Germany ............ 43 28 214.8

[51] Int. Cl.⁶ ............... B01D 41/04; B08B 9/00
[52] U.S. Cl. ............ 134/22.12; 134/20; 134/22.18; 134/39; 210/111; 210/106; 210/130; 210/203; 210/223; 210/791; 210/793
[58] Field of Search .......... 134/20, 22.1, 22.12, 134/22.18, 39; 210/111, 106, 130, 203, 223, 791, 793

[56] References Cited

U.S. PATENT DOCUMENTS

| 5,035,797 | 7/1991 | Janik | 210/232 |
|---|---|---|---|
| 5,089,129 | 2/1992 | Brigman | 210/223 |
| 5,186,829 | 2/1993 | Janik | 210/232 |
| 5,298,158 | 3/1994 | Anderson | 210/168 |
| 5,538,626 | 7/1996 | Baumann | 210/130 |
| 5,584,987 | 12/1996 | Mules | 210/130 |

*Primary Examiner*—Laurie Scheiner
*Attorney, Agent, or Firm*—Whitham, Curtis & Whitham

[57] ABSTRACT

The invention relates to a method and a conditioning system for regenerating replacement filters, a stackable transport container for use in such a system, and a replacement filter for regeneration by such a method. The following method steps are proposed for this purpose: removal of fluid residues from the replacement filter, flushing the filter element with a flushing agent opposite the direction of flow through the replacement filter when in use, removing the flushing medium residue from the replacement filter, measuring the flow resistance of the filter element, and comparing the measured flow resistance with one or more preset limit values. The conditioning system is characterized by at least one feed device (1, 21) for a replacement (2) filter to be regenerated, a flushing device (4) for flushing a filter element (35) of a replacement filter (2), a drying device (14) for drying a replacement filter (2), one or more measuring devices (7) for determining the flow resistance of a replacement filter (2), and a comparator for comparing a measured flow resistance with one or more preset limit values as well as a removal device (18, 20) for regenerated replacement filters (2).

19 Claims, 5 Drawing Sheets

METHOD AND CONDITIONING SYSTEM FOR REGENERATING REPLACEMENT FILTERS

This Application is a 371 of PCT/DE94/00972 Aug. 19, 1994.

The invention relates to a method for regenerating replacement filters for fluids with a particle-retaining filter element, a replacement filter for regeneration by such a method, a conditioning system for working the method, and a transport container for use in such a conditioning system.

Replacement filters with particle-retaining filter elements have become widespread over the last few decades in various areas of technology, particularly hydraulic and lubricating oil circuits. The advantages of such filters are particularly the low price and their easy and rapid replaceability with minimum downtimes and low labor requirement.

However the disadvantage of such filters is their disposal, since such filters must be treated as special waste because of the residual fluid and filtrate content. The number of such replacement filters has proven particularly problematical. The use of motor vehicle oil filters alone generates over 35 million such used replacement filters every year in Germany.

Most of these filters are usually burned in hazardous waste combustion plants. Because of the large amount of residual material generated and the expensive process of offgas scrubbing, such disposal is not only expensive but does not even solve the waste problem since the postcombustion materials, which have a high metal content, and the residual material from stack gas scrubbing must be disposed of.

To remedy this problem, a system was proposed in EP 0 279 469 B1 by which such used replacement filters could be comminuted. This made it possible to send the oil-soaked filter insert and the residual oil to combustion as formerly and to use the metal components as scrap.

Even though the use of such a system does relieve the pressure on disposal areas, this relief is only temporary since the amount of recyclable scrap that can be consumed by Germany's dwindling steel industry will diminish. Moreover, the possibility of recycling used oil is not utilized in this fashion.

In addition, the metal components must be cleaned to remove the residual oil clinging to them. This is usually done with organic solvents which are not only extremely volatile but also pose considerable environmental problems in disposal after use.

Accordingly, the goal of the invention is to produce a method and devices for reducing the volume of waste represented by used replacement filters.

This goal is achieved according to the invention by a method for regenerating replacement filters for fluids with a particle-retaining filter element with the following steps: removing fluid residues from the replacement filter, flushing the filter element with a flushing agent opposite the direction of flow through the replacement filter when in use, removing flushing agent residues from the replacement filter, measuring the flow resistance of the filter element, and comparing the measured flow resistance with one or more preset limit values.

The method according to the invention makes it possible to regenerate used replacement filters and hence to reuse replacement filters. By measuring the flow and comparing the measured flow resistance, the quality of the regenerated replacement filter can be checked and confirmed and unusable replacement filters can be rejected.

The goal is also achieved according to the invention by a conditioning system for working such a method, characterized by a flushing device for flushing a filter element of a replacement filter, one or more measuring devices for determining the flow resistance of a replacement filter, and a comparator for comparing a measured flow resistance with one or more preset limit values as well as a removal device for regenerated replacement filters.

Preferably a feed device for replacement filters to be regenerated is provided for automatically supplying the conditioning system. In addition, a drying device may be provided to dry a replacement filter.

With the system according to the invention, it is now possible to regenerate used replacement filters by exploiting the advantages of the method according to the invention on a large industrial scale and to render replacement filters reusable and practically as good as new.

The goal is also achieved according to the invention by a stackable transport container for accepting replacement filters and for use in such a conditioning system, which is characterized by a bottom that carries the replacement filters to be transported, an intermediate bottom with a plurality of openings through which the replacement filters to be transported can be placed on the bottom, whereby each of the openings is covered at least partially with one elastic collar with slits, each of which fits and supports the replacement filter to be transported.

The transport container according to the invention makes possible easy and economical sale of new or like-new replacement filters and recycling of used replacement filters in multi-path methods as is known for beverage bottles for example. In this process, the collars allow stable retention of various filter sizes so that different filter sizes can be stored simultaneously in one transport container and be transported. This is a particular advantage when used replacement filters from small garages or gas stations are to be recycled.

In addition, the goal is achieved by a replacement filter for fluids with a housing, a filter element accommodated in the housing, and a base plate with one or more holes, in such a way that some of the holes are closable by a check valve located inside the housing.

For regeneration by washing the filter element, the check valve can be pushed up by a lifting device so that the flushing medium can flow into the filter and circulate.

In addition, the goal is achieved according to the invention by a replacement filter for fluids with a particle-retaining filter element for regeneration by a method such that the filter element for regeneration by washing has a pore size that decreases along the flow direction of the fluid.

Such a filter element design produces a good filter effect with mechanical stability sufficient for multiple use and facilitates the flushing out of the filtrate during regeneration.

The goal is also achieved according to the invention by a replacement filter for fluids with a particle-retaining filter element and for use with such a method in which the filter element for regeneration by washing consists of a polymers The polymer is preferably surface-finished.

Washing away the filtrate, metal particles in particular, is facilitated by such a filter element.

The goal is also achieved according to the invention by a replacement filter for fluids with a particle-retaining filter element and for use with such a method, in which the filter element consists of a sintered metal or metal fabric.

Such a filter element allows an almost unlimited number of regeneration cycles since it is very stable mechanically and because there is practically no change in pore size during its useful life. Such a filter element withstands sharp drops in pressure and is insensitive to jolts, vibrations, and deformation of the replacement filter.

The goal is also achieved according to the invention by a replacement filter for fluids with a particle-retaining filter element and for use with such a method, in which the filter element consists of a foamed glass. The filter element can also consist of mineral fibers or a mineral fiber fabric or of a ceramic material.

Such a filter element allows an almost unlimited number of regeneration cycles, since it is very stable chemically and mechanically and because almost no change in pore size occurs during its useful life. Such a filter element withstands sharp pressure drops even at high temperatures.

The method according to the invention preferably encompasses the determination of the replacement filter type. This allows optimal matches of process parameters to the filter type processed in each instance. Preferably, the method according to the invention is characterized in that the preset limit values are type-related. This makes it possible to ensure high quality of the regenerated filters with optimum process economics.

In a preferred embodiment, the method according to the invention is characterized by the following step: characterizing a replacement filter as unusable when the measured flow resistance of this replacement filter is outside the range delimited by the preset limit value or values.

This makes possible a more flexible design of the process, since an unusable filter can not only be removed from the process immediately it is identified as such but it can also be removed at any point further along to avoid unnecessarily passing through subsequent process steps, and especially right at the end of the process.

Preferably, the residual fluid is removed from the replacement filter when the filter element is flushed. By this integration of the two process steps, the economics of the process in use are further improved, particularly because no special fluid is required for measurement.

It is also useful, for the same reason, for the flow resistance to be measured when the filter element is flushed.

To improve the economics, the flushing agent residues are preferably removed by drying, particularly by drying the replacement filter with air.

The flushing medium can also be a thin oil compatible with the engine oil when the replacement filter is reused. In this case, the relatively cumbersome drying step for the filter can be dispensed with. In addition, the flushing medium does not need to be prepared.

It is particularly advantageous for the flow resistance to be measured when drying the filters with air. By this integration of the two process steps, the process economics are further improved. If such a measurement takes place in addition to measuring the flow resistance when flushing, an even more precise determination of the filter condition may be made by measuring with two media of different viscosities.

This possibility can be used particularly effectively for quality assurance for the regenerated replacement filter if different limit values are preestablished for measuring the flow resistance when flushing and when drying.

For the flushing agent to be used in a closed circuit in an environmental benign manner, it is advantageous for the fluid residues after the filter element has been flushed to be separated from the flushing agent.

For the same reason it is advantageous for the flushing fluid residues contained in the air after the replacement filter has been dried to be separated.

For better consumer acceptance and to provide a guarantee comparable to that for new replacement filters, it is advantageous for the process to comprise the following steps: removing an old gasket from the replacement filter and fitting the replacement filter with a new gasket.

A further advantageous embodiment of the system according to the invention is characterized by the feed device being a linear conveyor belt. This makes it possible to use conventional system components and to arrange assemblies on both sides of the feed device. Such an arrangement moreover appears advantageous for large-capacity systems so that several systems can be installed side by side.

It can also be advantageous with small facilities for the feed device to be a turntable. This gives a particularly compact design for the system, as for example a robot feeder can be used to feed the system with replacement filters and remove them at the same time.

It is particularly advantageous for automatic operation of a large conditioning system for the feed device to have an automatic loading station for removing replacement filters from an appropriate transport container.

A transport container according to the invention is advantageously characterized by the slits dividing the collars into segments of approximately the same size. This gives the replacement filter an approximately central position in the opening, which is particularly favorable for automatically removing the replacement filters from the transport container.

For transporting used replacement filters, it is particularly advantageous for the bottom to be formed as a collecting pan for the fluid escaping from the replacement filters.

Since the replacement filters usually have a sheet steel housing, for the filters to be held firmly in the transport container it is advantageous for the bottom to have a number of magnetic areas each of which is associated with one opening in the intermediate bottom.

This can easily be accomplished by the magnetic areas being formed by magnets attached to the bottom.

To maintain uniform removal forces and protect the magnets from corrosion, it is advantageous for the magnets to be sheathed with plastic, at least in part.

In particular for ensuring a replacement filter orientation favorable for automatic removal of the replacement filter from the transport container, it is also advantageous for a number of supporting elements to be located on the bottom, with each of which an opening is associated, and which are approximately concentric with respect to these openings, particularly if the supporting element is essentially annular.

A replacement filter according to the invention is advantageously characterized by the polymer being a sintered polymer. In this way, a suitable porous filter insert can be made at low cost.

If the polymer is a polyolefin, a filter insert is obtained which can be burned in a conventional waste combustion system as soon as a replacement filter has become unusable and must be disposed of.

The invention will now be described in greater detail on the basis of the embodiments shown in the drawings.

Figure 1:
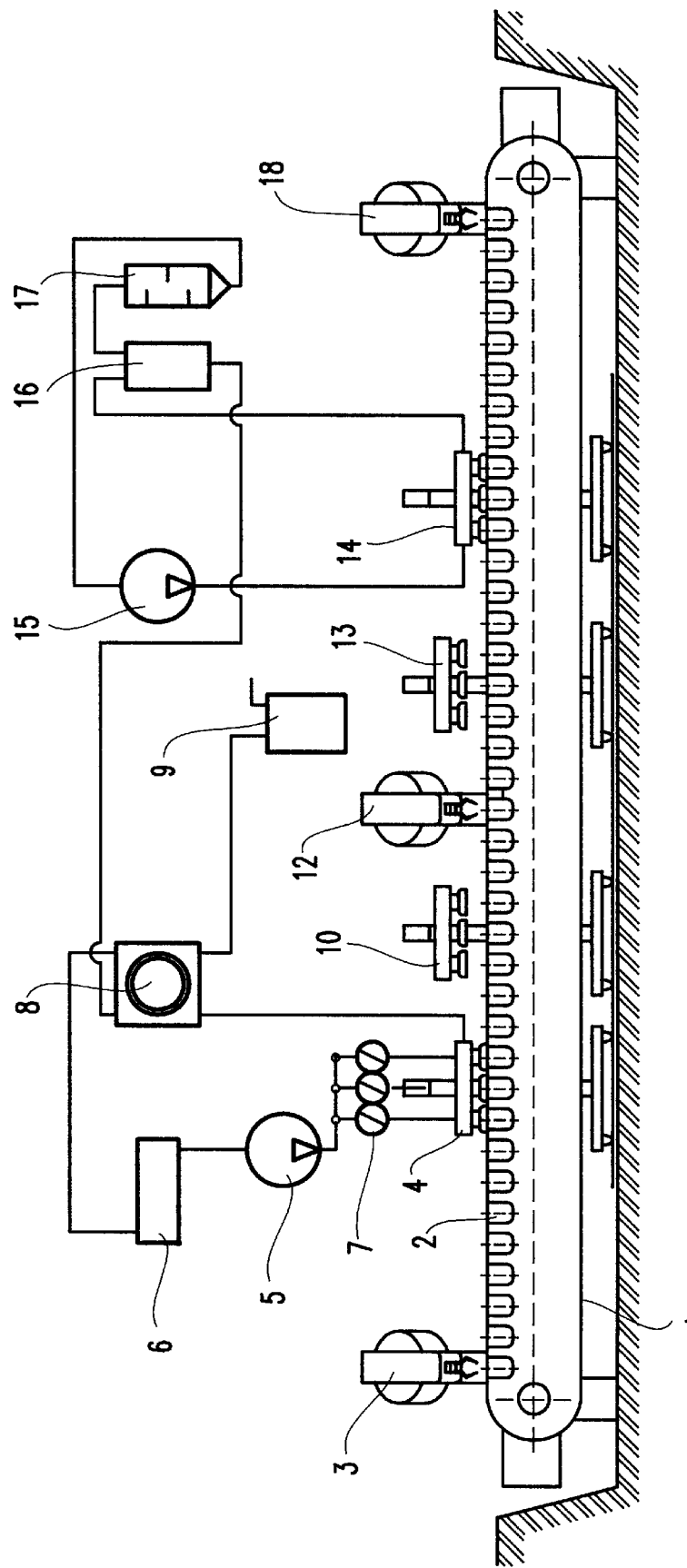
FIG. 1 is a schematic side view of a conditioning system according to the invention for working the method according to the invention.

The conditioning system shown in FIG. 1 comprises a linear conveyor belt 1 on which the used replacement filters 2 are loaded by an automatic loading station 3. Conveyor belt 1, driven by a control not shown, brings replacement filter 2 to a flushing device 4. Flushing device 4 shown is provided for simultaneous flushing of three replacement filters 2. The three connectors of flushing device 4 are individually guided vertically so that different filter types with housings 36 of different sizes can be processed together.

By means of flushing device 4, the flushing agent pumped by a pump 5 from a supply container 6 is fed through separate lines into replacement filter 2. One measuring device 7 is built into each of the lines to determine the flow resistance of each replacement filter 2.

The flushing agent leaving replacement filters 2 with the residual fluid and flushed-out filtrate is sent to a separator 8 through a common line. Here, the filtrate residue and the residual fluid are separated and the residual fluid is conducted to a receptacle 9. The residual fluid collected in receptacle 9 can be sent for normal processing.

Replacement filters 2 are transported from flushing device 4 by conveyor belt 1 to a disassembly device 10 by means of which old gaskets 11 are removed from replacement filters 2.

A rejection claw 12 is connected to disassembly device 10 and this, once the flow resistance has been measured by a comparator not shown which compares the measured values found with one or more limit values, removes replacement filter 2 recognized to be unusable from conveyor belt 1.

This is followed by an automatic assembler 13 whereby replacement filter 2 is provided with a new gasket 11.

From automatic assembler 13, replacement filters 2 are conveyed to a drying device 14. In drying device 14, replacement filters 2 are blasted with air delivered by a compressor 15 to remove any residual flushing agent that is still in replacement filters 2.

Flushing agent residues are removed from the air leaving replacement filters 2 by a separator 16 and these residues are conveyed by a return conveyor to separator 8. The air, now free of flushing agent residues, is sent through another filter 17 before being compressed once more in compressor 15.

If a thin oil is used as a flushing agent, which is compatible with motor oil, it is unnecessary to dry the filter and process the flushing agent.

Finally, the now-regenerated replacement filters 2 are conveyed to a removal device 18 by which replacement filters 2 are taken off conveyor belt 1 and packed in a suitable transport container 19. The regenerated replacement filters 2 are now ready for shipping to reuse.

Figure 2:
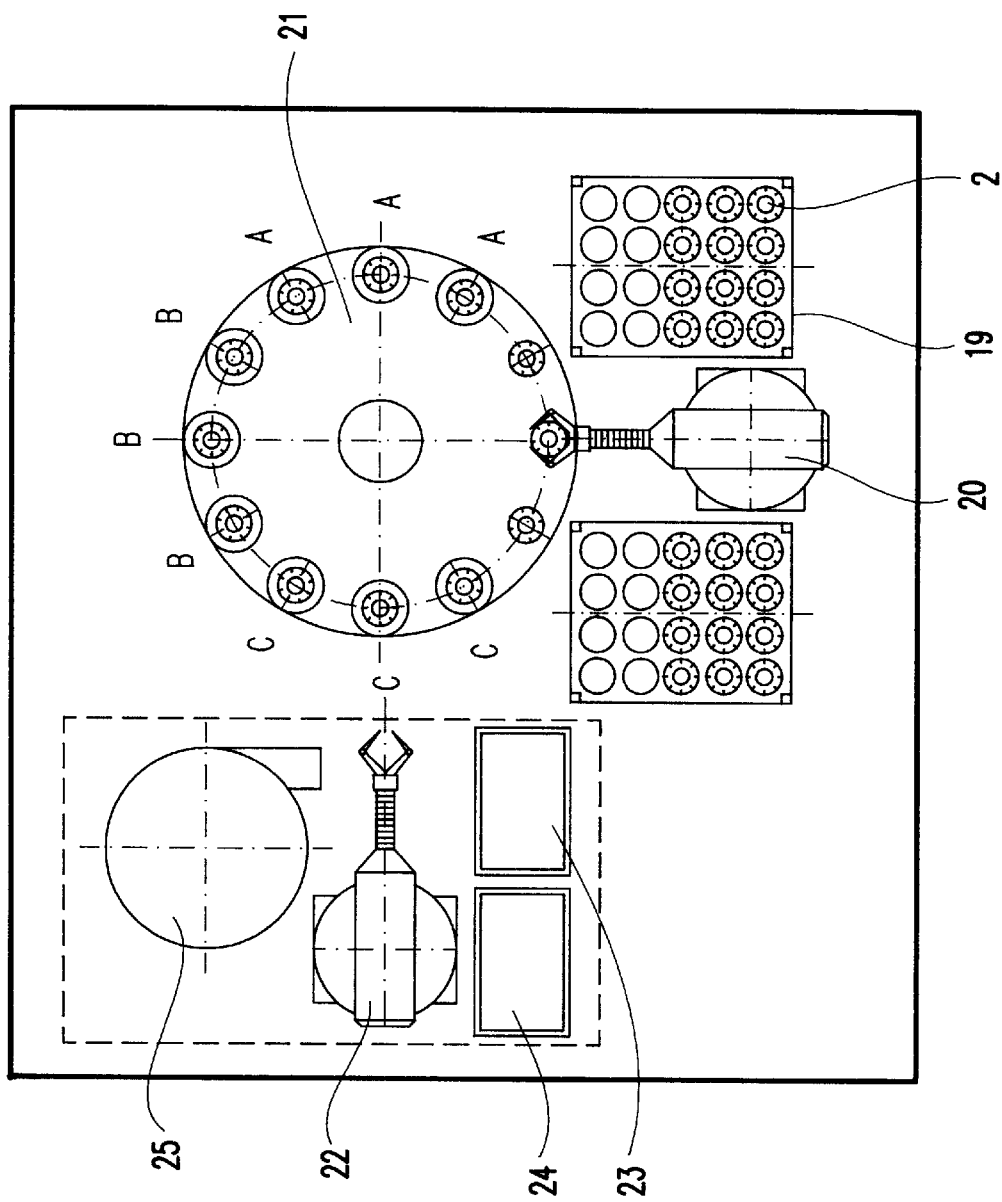
FIG. 2 is a schematic top view of another conditioning system according to the invention.

The conditioning system shown in FIG. 2 differs from the systems previously described by a particularly compact design.

In this embodiment of the invention as well, three replacement filters 2 at a time are simultaneously subjected to a processing step.

Replacement filters 2 are removed by a robot grab 20 from a special transport container 19 and placed on a turntable 21. The turntable is then rotated 60 degrees so that these replacement filters 2 in positions A can be flushed and checked by a flushing and measuring device not shown here.

After the next feed step, these replacement filters 2 are dried in positions B as in the embodiment described above.

In positions C, the old gaskets 11 are removed by a robot assembler 22, placed in a corresponding gasket collector 23, unusable replacement filters 2 are removed from turntable 21 and placed in a collector 24. The replacement filters 2 that remain on turntable 21 are each provided with a new gasket 11 which is passed to robot assembler 22 by a vibrating conveyor 25.

Regenerated replacement filters 2 are then removed by robot grab 20 in the starting position of turntable 21 and placed in another transport container 19. Regenerated replacement filters 2 are thus available for sale and reuse.

The old gaskets 11 in containers 23 and 24 and replacement filters 2 that can no longer be used can be sent for suitable disposal.

Figure 3:
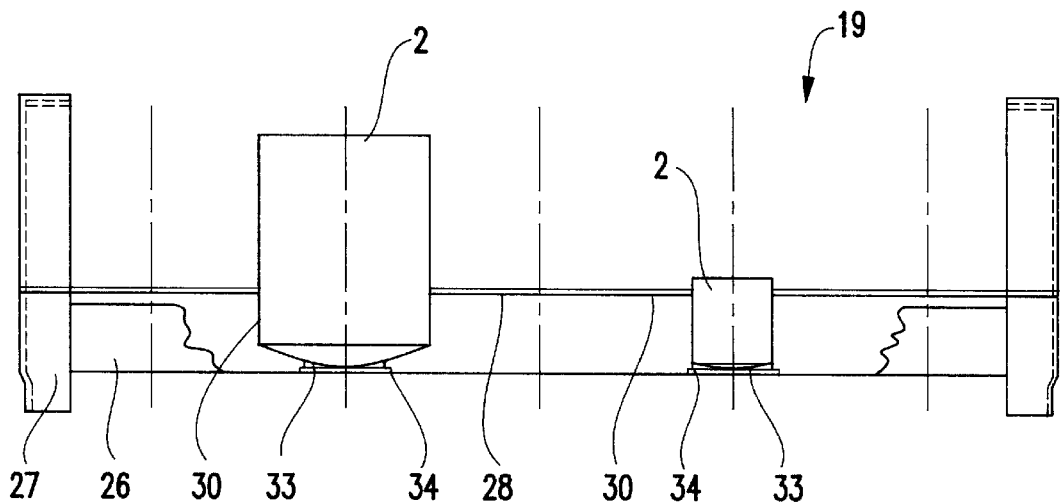
FIG. 3 is a side view of a transport container according to the invention, in partial cross section.
Figure 4:
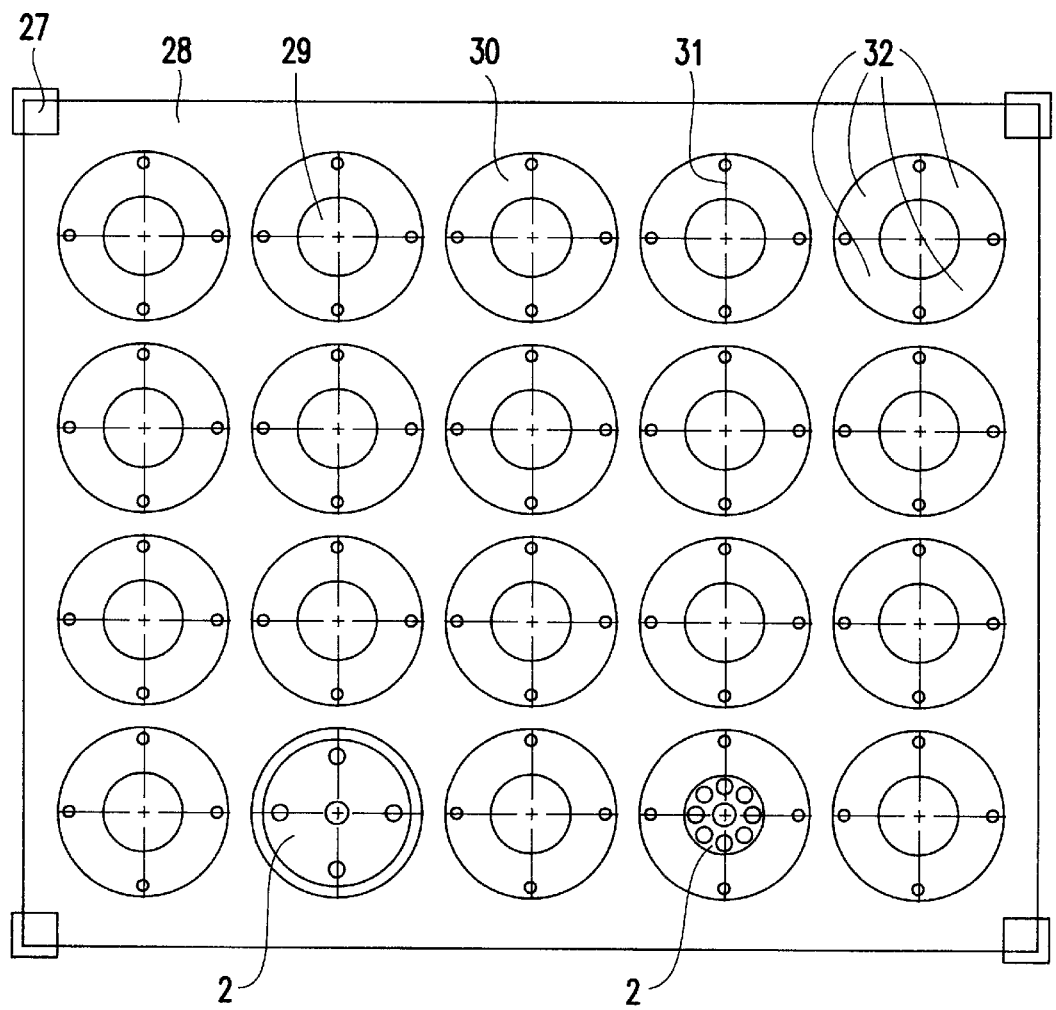
FIG. 4 is a top view of a transport container according to the invention.

The stackable transport container 19 shown in FIGS. 3 and 4 consists of a bottom 26 formed as a collecting pan and four posts 27 attached at the corners which are designed so that their bottoms can be inserted into the tops of posts 27 beneath them.

An intermediate bottom 28 extends over bottom 26 and approximately parallel thereto. The distance between bottom 26 and intermediate bottom 28 corresponds to approximately the height of the housing of whichever commercial replacement filter 2 is lowest. Intermediate bottom 28 has a plurality of openings 29 each of which is partially covered by an annular elastic collar 30. Collars 30 are divided by four slits 31 into four segments 32.

Replacement filters 2 are passed through openings 29 onto bottom 26. Here, collars 30 fit to the respective diameters of replacement filters 2 and thus support them to prevent replacement filters 2 from tipping over and thus prevent any residual fluid from escaping from replacement filters 2.

Flat plastic-sheathed magnets 33 are located concentrically with respect to openings 29 below these openings 29 and on bottom 26, and these magnets are surrounded by annular supporting elements 34 made of oil-resistant plastic.

Together with collars 30, these parts ensure that replacement filters 2, which normally have curved bottoms, stay upright and keep replacement filters 2 in this position. This avoids problems when replacement filters 2 are automatically taken off into a loading station 3 of a conditioning system according to the invention.

Figure 5:
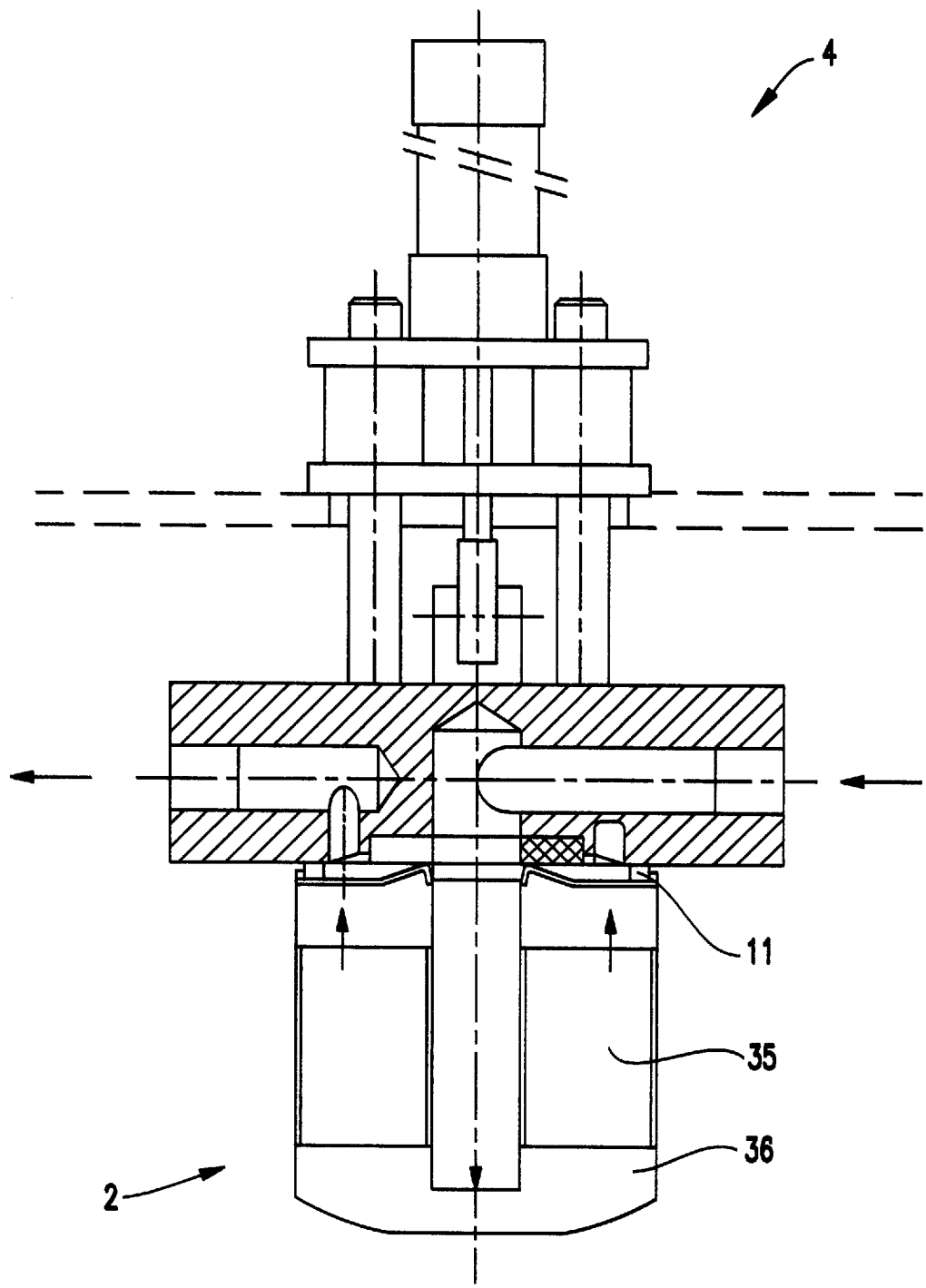
FIG. 5 is a schematic cross section of a flushing device of a conditioning system according to the invention with a replacement filter to be regenerated.

A replacement filter 2 according to the invention, as shown in FIG. 5, corresponds in design essentially to known replacement filters, and in particular its external and connecting dimensions conform to current standards (DIN/ISO 6415). However, its filter element 35 does not, as is normal, consist of a filter paper but of a surface-finished polymer.

Preferably, this filter element 35 is sintered so that during manufacture it automatically acquires a porosity which can be adjusted. If the polymer used is a polyolefin, such a filter element 35 can be burned in a waste combustion facility with minimal emissions of harmful substances if replacement filter 2 can no longer be used because it is excessively contaminated or mechanically damaged.

If filter element 35 is made of a sintered metal, a considerably longer service life can be achieved because of its mechanical stability. Such a filter element 35 is insensitive to jolts and vibrations. The function of a replacement filter 2 with such a filter element 35 is largely retained even when its housing 36 is deformed.

Alternatively, filter element 35 can be made of a foamed glass, of mineral fibers, of a mineral fiber fabric, or a ceramic. The porosity can easily be adjusted with this method of manufacture as well. In addition, such a filter element 35 is extremely mechanically, chemically, and thermally resistant when it is attached elastically and mounted in housing 36 of replacement filter 2. For this reason, an almost unlimited number of regeneration cycles is possible.

Figure 7:
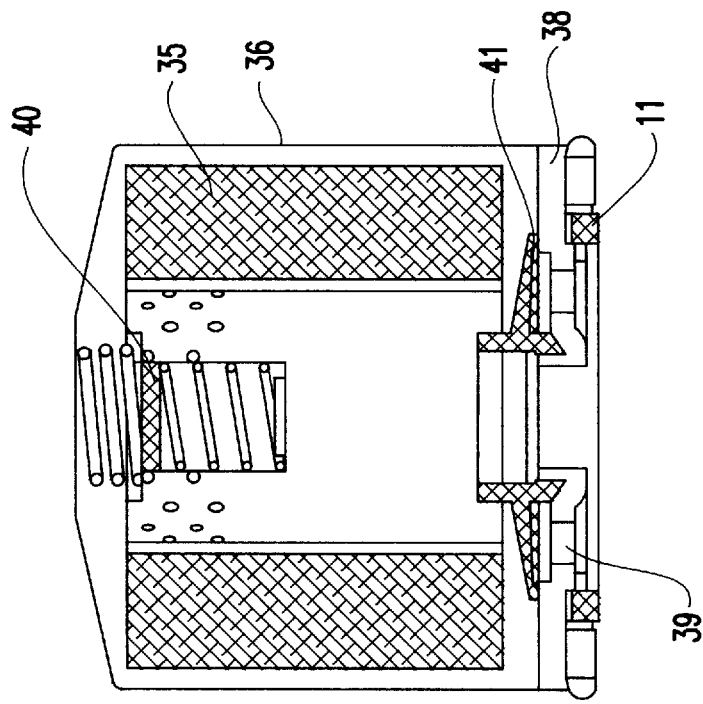
FIG. 7 is a schematic cross section through a replacement filter according to the invention with the check valve closed.
Figure 6:
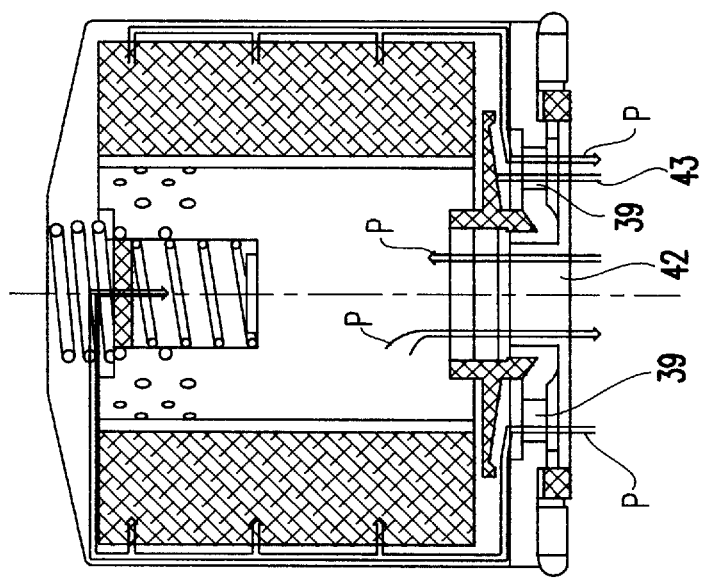
FIG. 6 is a schematic cross section through a replacement filter according to the invention with the check valve open.

FIGS. 6 and 7 show a further embodiment of a replacement filter according to the invention. Additional holes 39 are provided in base plate 38 next to the connecting hole 42 for the engine block. These holes are preferably arranged regularly in a section of a circle. A check valve 41 disposed inside housing 36, which valve is made of a rubber element, closes off holes 39. For flushing filter element 35, check valve 41 is pushed up by a lifting device 43 and the flushing agent can penetrate or flow out of the replacement filter.

The flushable replacement filter according to the invention resembles the oil filters previously used in function. During the operating phase, the oil penetrates the filter through holes 39, presses the check valve or its rubber gasket upward, flows past the bottom of filter element 35, and up the inner wall of housing 36. The oil is then pressed through the filter material, and the dirt particles in the oil are retained. The oil leaves the filter again through the openings in the cylinder inside the filter cartridge and the outlet hole. This circuit is indicated with arrows P in FIG. 6.

If the dirt-holding capacity of the filter material is exhausted or the oil becomes too viscous at low temperatures, the oil can no longer be forced through the material. In this case, bypass valve 40 at the upper part of filter housing 36 opens and the oil flows back out of the valve, unfiltered.

If the oil circuit is interrupted, because the engine is shut off for example, oil should remain the filter housing so that when the engine is started again, a closed oil circuit is reestablished as soon as possible. This function is carried out by check valve 41 made of a rubber element. Once the engine has been shut off, the gasket returns to its resting position and lies on base plate 38 so that no more oil can flow out of the filter through holes 39.

We claim:

1. A method for regenerating replacement filters usable in oil circuits of internal combustion engines, wherein a filter element that retains particles is enclosed in a housing, comprising the following steps:

removing said fluid residues from a replacement filter;

flushing said replacement filter with an oil as a flushing agent, to clean said replacement filter, said flushing step directing said flushing agent through a filter element of said replacement filter in a direction opposite a direction of oil flow through said replacement filter when said replacement filter is in use in said oil circuit;

draining said flushing agent from said replacement filter, said draining stem leaving at least a portion of said flushing agent in said replacement filter;

measuring a flow resistance of said replacement filter; and comparing a measured flow resistance from said measuring step with one or more preset limit values.

2. A method according to claim 1, further comprising the following steps of:

determining a replacement filter type for said replacement filter.

3. A method according to claim 2, further comprising selecting said one or more preset limit values for said comparing step based on said replacement filter type determined in said determining step.

4. A method according to claim 3, further comprising the following step:

characterizing a replacement filter as unusable when a measured flow resistance of said replacement filter is outside a range delimited by a preset limit value or values.

5. A method according to claim 4, wherein residual fluid from the replacement filter is removed when the filter element is flushed.

6. A method according to claim 5, wherein said flow resistance is measured when said filter element is flushed.

7. A method according to claim 6, wherein fluid residues are separated from said flushing agent after flushing said filter element.

8. A method according to claim 7, further comprising the following steps:

removing an old gasket from said replacement filter; and fitting said replacement filter with a new gasket.

9. A conditioning system for regenerating replacement filters for fluids comprising:

a flushing means, for flushing a filter element of a replacement filter, one or more measuring devices for determining a flow resistance through said filter element of said replacement filter, and a comparator for comparing a measured flow resistance with one or more preset limit values; and a removal device for removing regenerated replacement filters.

10. A conditioning system according to claim 9, further comprising at least one feeding means for replacement filters to be regenerated for supplying replacement filters to said flushing means.

11. A conditioning system according to claim 10 further comprising a means for determining a replacement filter type for each of a plurality of different replacement filters.

12. A conditioning system according to claim 11 further comprising means for associating one or more limit values with each replacement filter type.

13. A conditioning system according to claim 12 further comprising a means for removing unusable replacement filters from said conditioning system.

14. A conditioning system according to claim 13, further comprising a means for separating fluid residues from a flushing agent used in said flushing device.

15. A conditioning system according to claim 14 further comprising a means for removing an old gasket from a replacement filter and installing a new gasket on said replacement filter.

16. A conditioning system according to claim 14, wherein one of said one or more measuring devices is built into said flushing means.

17. A conditioning system according to claim 10 wherein said feed means is a linear conveyor belt.

18. A conditioning system according to claim 10 wherein said feed means is a turntable.

19. A conditioning system according to claim 18 wherein said feed means has an automatic loading station for removing replacement filters from a transport container.

* * * * *